Jan. 12, 1971   J. G. HUNT ET AL   3,553,829
METHOD OF FORMING CHANNEL PLATES
Filed Oct. 31, 1968   2 Sheets-Sheet 1
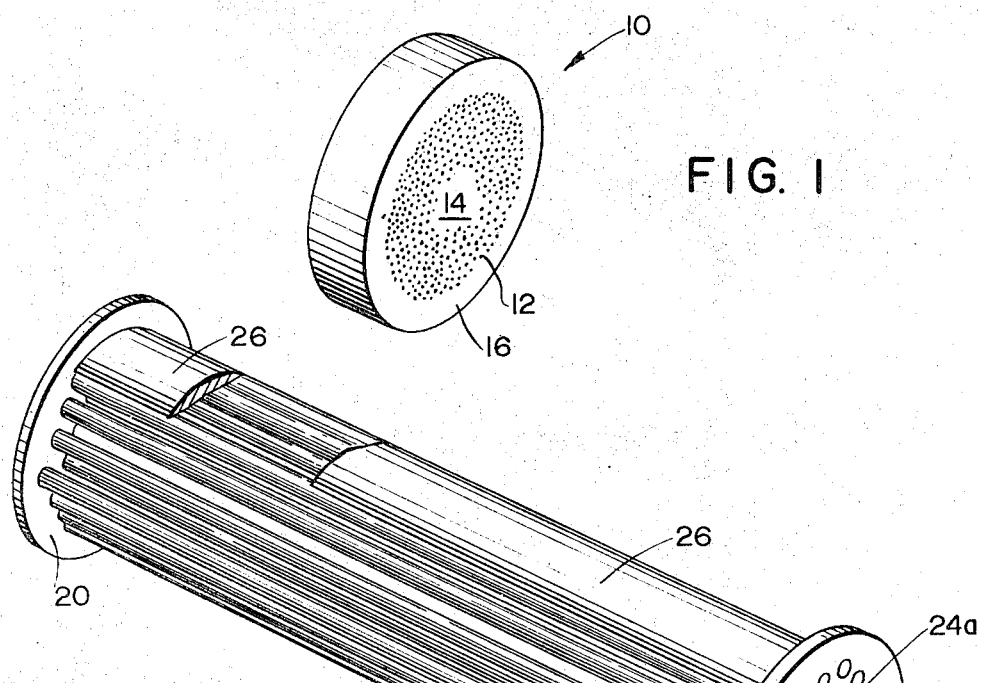
FIG. 1
FIG. 2
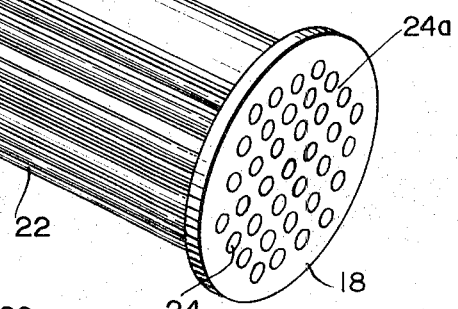
FIG. 3
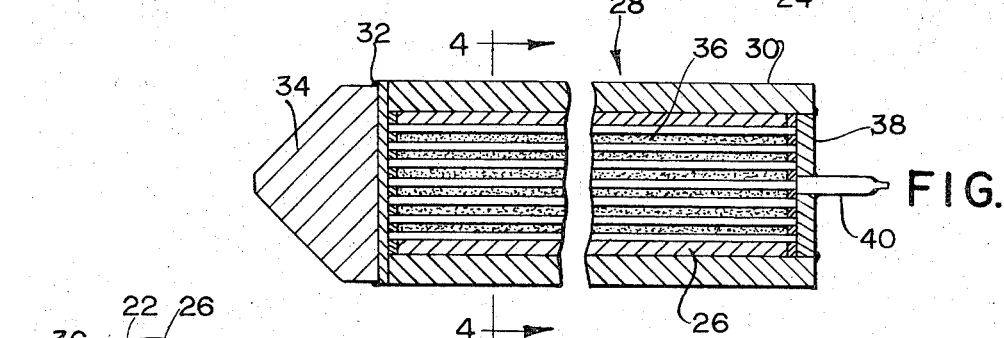
FIG. 4
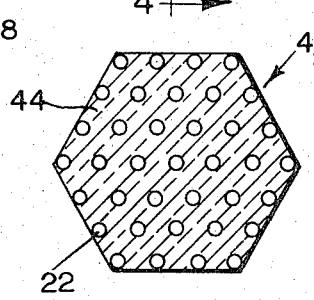
FIG. 5
INVENTORS
GERALD I. FRIEDMAN
JAMES G. HUNT
BY
Blair Cesari and St. Onge
ATTORNEYS

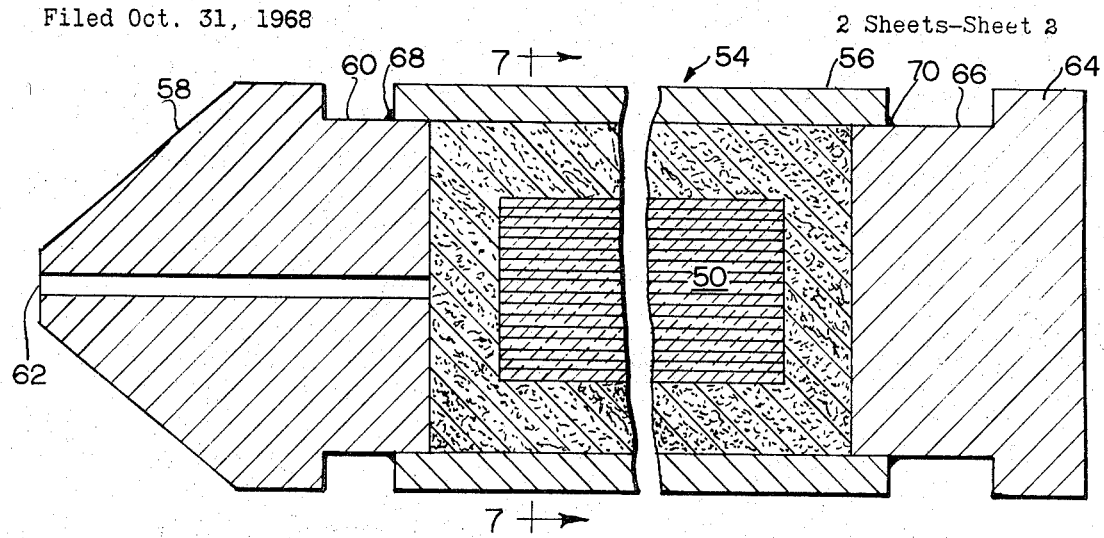
FIG. 6
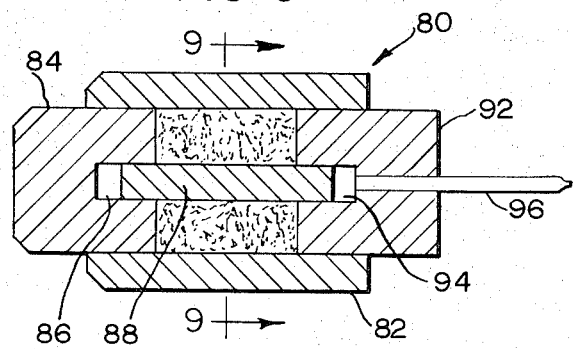
FIG. 8
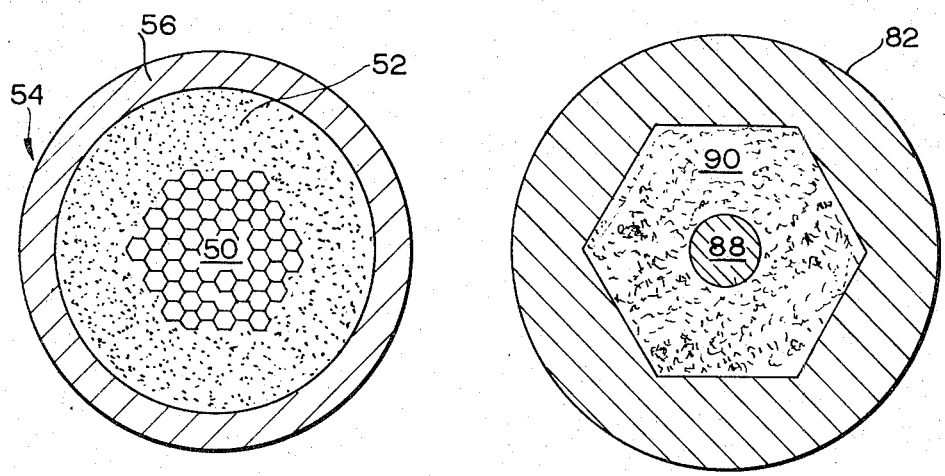
FIG. 7
FIG. 9

United States Patent Office 3,553,829
Patented Jan. 12, 1971

3,553,829
METHOD OF FORMING CHANNEL PLATES
James G. Hunt, Framingham Center, and Gerald I. Friedman, Concord, Mass., assignors to Nuclear Metals Division, Whittaker Corporation, West Concord, Mass.
Filed Oct. 31, 1968, Ser. No. 772,217
Int. Cl. B23p 17/04
U.S. Cl. 29—592                    15 Claims

ABSTRACT OF THE DISCLOSURE

A channel plate is produced from glass powder by extruding the powder within a canister having a number of disposable rods extending parallel to each other within the powder. This forms a bar having a solid glass core in which the rods are embedded. The resultant bar is cut lengthwise into segments which are treated to remove the canister material, packed side by side into a second extrusion canister, and then re-extruded to bond the segments to each other. The final bar resulting from this extrusion is then cut into channel plates of the desired thickness, after which the disposable rods are removed from the plates. This leaves a number of channel plates having an extensive number of ordered channels extending axially through them.

BACKGROUND OF THE INVENTION

(a) Field of the invention

The invention relates to materials fabrication. More particularly, it relates to a method of making a channel plate from a powder of glass or other material.

(b) Prior art

A channel plate is an electron-beam amplifying and collimating device having a large number of channels with electrically conductive walls extending in an ordered array through a nonconductive matrix.

Heretofore, channel plates have been formed from glass tubing by gathering lengths of the tubing into a bundle, heating the bundle, and drawing it through a die to decrease its diameter and to cause fusion of the individual glass tubes to each other. Unfortunately, many of the materials of interest for channel plates are not available in the form of tubing and therefore it is first necessary to form the tubing one's self before proceeding to the drawing operation; this increases the cost of the process and the time consumed by it, and limits its use to those glasses which are readily capable of forming tubing.

BRIEF SUMMARY OF THE INVENTION

Accordingly, it is an object of the invention to provide an improved method of making a channel plate.

Further, it is an object of the invention to provide a method of making a channel plate from nontubular material.

Another object of the invention is to provide a method of making a channel plate from powdered material.

Yet another object of the invention is to provide a method of making a channel plate from powdered glass.

We have found that channel plates of relatively uniform structure may be produced from powdered glass by pressure-forming operations such as by extrusion. Since most glasses of interest for forming such plates are available as glass powder, the method of our invention is applicable to a much broader range of materials than was heretofore the case.

In forming channel plates according to one embodiment of our invention, a number of disposable rods are oriented parallel to each other within an extrusion canister. Each of these rods will ultimately define a single channel in the channel plate. Preferably the canister has a hexagonal interior cross section so that very close packing of the extruded materials may be obtained in subsequent extrusions. The material which is to form the channel plate is added to the interior of the canister in the form of a powder which is sifted into place around the rods, after which it is preferably compacted around them to increase its bulk density. The extrusion canister is then sealed and extruded at an elevated temperature but below the melting point of the glass or rods, to form an extruded bar of increased length and decreased cross section. During the extrusion, the powdered glass sinters to form a dense, solid mass enveloping the rods. The glass in turn is surrounded by, and at least partially joined to, the material of the container in which it was extruded.

Since the number of rods extending through the extruded bar during the first extrusion will generally be much less than the total number of channels which are desired in the final channel plate, several bars or bar segments are joined togeher side-by-side in an extrusion step to provide a composite bar having the desired number of channels. The bars are prepared for this re-extrusion by first segmenting the exposed core into smaller lengths and by then removing the canister material to expose the hexagonal glass cores. The segments are then assembled side-by-side into a close-packed bundle. To obtain a solid glass periphery around the bundle, the bundle is surrounded on all sides by powdered glass within the extrusion canister; this periphery provides a convenient mounting means and also adds structural integrity to the formed plate. After the second extrusion, the composite rod is cut into slices of the desired thickness and both the canister material and the filler rods are removed (for example, by acid leaching) to form the final plate and to expose the channels extending through it. Conductive walls are then formed on each of these channels by appropriate treatment. For example, if the channel plate is formed from a glass having a metallic oxide as one of its components, the plate may be fired in a reducing atmosphere to form a conductive metallic coating on the exposed surfaces by reduction of the metallic oxide.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a view in perspective of a typical channel plate formed by the method described herein;

FIG. 2 is a view in perspective of a pair of index plates for use in axially aligning the filler rods within the extrusion canister;

FIG. 3 is a longitudinal section view of an extrusion canister having the rods and index plates of FIG. 2 positioned therein;

FIG. 4 is a cross-sectional view along the lines 4—4 of FIG. 3;

FIG. 5 is an enlarged cross-sectional view of an extruded bar formed from the apparatus of FIGS. 3 and 4 and having its outer surface freed of the canister material which was joined during the extrusion;

FIG. 6 is a longitudinal section of an extrusion canister having the bundled hexagonal sections of FIG. 5 packed within it;

FIG. 7 is a cross-sectional view taken along the lines 7—7 of FIG. 6;

FIG. 8 is a longitudinal section of an alternate form of extrusion canister suitable for performing the first extrusion; and FIG. 9 is a cross-sectional view along the lines 9—9 of FIG. 8.

SPECIFIC DESCRIPTION OF THE INVENTION

FIG. 1 shows a channel plate 10 having hollow channels 12 extending axially through it. The apertures 12 (shown as dots) occupy the center section of "active area" 14 of the plate and are surrounded by an outer periphery or "skirt" 16. The size and the number of channels extending through the plate 10 are only schematically illustrated in FIG. 1; in practice the center section 14 may contain upwards of 8,000 channels, each of the order of .005 inch in diameter, distributed over an area approximately ¾ of an inch in diameter.

The steps utilized in forming the channel plate of FIG. 1 are illustrated in FIGS. 2 through 6. Specifically, FIG. 2 illustrates a device for properly aligning the rods which ultimately define each of the channels 12. As shown in FIG. 2, a pair of index plates 18 and 20 carry cylindrical rods 22 extending between them and resting in cylindrical apertures 24 in each of the plates; the plates 18 and 20 orient the rods 22 parallel to each other. The apertures 24 are distributed over the plates in a hexagonal pattern 24a for reasons which will be described in detail hereinafter.

After the rods have been inserted into the apertures 24 in the index plates 18 and 20, filler plates 26 are strapped around the array on each face. These plates comprise arcuate segments having an outer curved surface whose radius is equal to that of the index plates 18 and 20 and having an inner flattened surface of width equal to the width of a face of the hexagonal array. The assembled filler plates, index plates and rods are then inserted into a canister 28 having a cylindrical sidewall 30 joined at its forward end to a cylindrical closure plate 32. The filler plates 26 conform snugly to the interior wall of the container. A nose cone 34 is joined to the closure plate 32 to provide a transition section for the container 26 when it is extruded. The material from which the index plates 18 and 20, rods 22 and filler plates 26 are formed will depend on the material used to form the matrix of the channel plates as noted hereinafter but is commonly copper.

The canister 26 is next stood on end on the nose cone 34 and filled with powder 36 of the material from which the channel plate 10 is to be formed. This may be accomplished by providing a small bore through index plate 18 and feeding the powder through this hole. While this is being done, the canister 28 is gently vibrated to increase the packing density of the powder. With powder of approximately 10–150 microns in diameter, a packing density of 50–60% of the theoretical maximum may be achieved in this manner.

When the filling is complete, a rear closure plate 38 is welded to the wall 30 of the canister 28. The plate 38 has an exhaust tube 40 extending through it for evacuation of the canister before it is sealed off. After evacuating, this tube is sealed and the canister is then ready for extrusion through an extrusion die which will simultaneously reduce its cross section, increase its length, and form the loose, friable powder into a dense, solid mass surrounding the rods 22. To assist in the extrusion, the extrusion canister 25 and its contents may be heated to an elevated temperature which is below the approximate softening point of the glass or the melting point of any of the materials present. The canister is then extruded to form a solid cylindrical bar having a hexagonal glass inner core surrounded by expendable canister material which has been joined to the core during the extrusion. The cross section of the extruded bar is similar to that shown in FIG. 4 but the powder is transformed by the extrusion to a dense, solid mass surrounding the rods 22 within it. The cladding from the canister may then be removed by pickling the bar in an appropriate corrosive solution. During the pickling, the end faces of the bar are coated with a corrosive-resistant material to protect the rods 22 extending through the bar.

The hexagonal core remaining after the outer canning material is removed is shown enlarged in FIG. 5. The core 42 has a number of rods 22 arranged within a now solid body 44. The core 42 has the same geometry as the interior of the container shown in FIG. 4 but it is uniformly reduced in cross section, as are the rods 22.

The hexagonal cores 42 do not, as yet, contain a sufficient number of rods 22 extending through them to form a channel plate having the desired number of channels. Accordingly, a second extrusion is required in which a number of these cores are packed together and re-extruded to form the desired number of channels. This is illustrated in FIGS. 6 and 7 which show the cores 42 packed closely together to form a bundle 50 which will ultimately provide the central core 14 of the channel plate of FIG. 1. The cores 42 are closely packed within this bundle and have their longitudinal axes aligned in parallel with each other. The bundle 50 is surrounded by powder 52 disposed within a cylindrical extrusion canister 54 having a cylindrical side wall 56. A shaped nose cone 58 having a reduced collar 60 and an evacuation conduit 62 is attached to the canister 56 and the canister is closed by an end closure 64 having a reduced collar portion 66. The reduced collars lead to compaction of the powder during extrusion as will be explained in more detail below. The nose cone 58 and end closure 64 are tack welded to the jacket 44 at welds 68 and 70.

As was the case with the canister 28, the canister 54 may be lightly vibrated while it is being filled with the powder 52 in order to pack the powder within the canister more densely. Further mechanical compaction may also be utilized during the filling process if desired.

After the canister 54 has been filled and sealed, the canister and its contents are heated to an elevated temperature just prior to extrusion and are then extruded through a die of appropriate size. When the nose cone 58 encounters the extrusion die, the tack welds 68 and 70 are ruptured and the end plug 64 slides into the canister along the reduced portion 66, simultaneously carrying the wall 56 along the reduced portion 60 on the nose cone 58. This causes a compression of the powder 52 within the canister until the full extrusion pressure is reached; at this point, the canister 54 and its contents are forced through the extrusion die to produce a solid cylindrical rod having an outer layer of canister material surrounding an inner layer of solid material formed from the powder 42; the inner layer in turn surrounds a central core 50 having rods 22 extending axially through it. The cross section of this bar is similar to that shown in FIG. 7 with the exception that the material surrounding the core 50 is now a fully dense solid.

After this final rod has been properly annealed or otherwise heat treated, it is sliced into plates of the desired thickness. These plates are deposited in a pickling bath of a corrosive material which simultaneously removes the outer canning material and leaches away the rods 22 extending through the bar to thereby form a large number of axially-extending channels of small size and uniform distribution as shown in FIG. 1.

At this point, the glass channel plates that have been formed are still "inactive," that is, electrically-conductive walls have not yet been formed within the channels. Various approaches may be taken to "activate" the channel plates. One such approach is to utilize vapor deposition to apply a thin metallic coating to the channel walls. This presents difficulties since the cross section of the channels is very small and controlling the vapor deposition is therefore quite difficult. A preferred technique is to utilize, for forming the channel plates, a material which incorporates a metallic oxide which is reducible to the metal. For example, if the channel plate 10 is formed from a glass containing a lead oxide, the oxide on the interior walls of the channel may be reduced to the metal by firing the plate 10 in a hydrogen atmosphere. After the hydrogen firing, the channel plate is then cleaned and is ready for use in its intended applications.

Since most materials can be extrusion-bonded from a powder to form a desired structure, the types of materials available for forming the channel plate 10 are theoretically infinite. In practice, however, only a rather limited number of materials would be used. Chief among these is a glass composition denoted as Corning 8161 Glass, which is a potash lead containing Silica ($S_1O_2$), lead oxide (PbO), soda ($Na_2O$), potash (KO) and lime (CaO) and having an annealing point of 435° C. This glass is commonly used for electron tube envelopes. Its extrusion constant K (defined by the relation $P=KlnR$, where P is the extrusion pressure in tons per square inch, K is the extrusion constant in tons per square inch, and R is the ratio of the initial cross section to the final cross section, otherwise known as the reduction ratio, the symbol lnR denoting the natural logarithm of the reduction ratio) is approximately 12 tons/in.$^2$ at 540° C. and is of the same order of magnitude as the extrusion constant of copper at this temperature. Accordingly, copper may advantageously be used for the filler rods and canister. For other types of glasses, a harder or softer material, as the case may be, will be used for the rods and canister. This material should match the extrusion constant of the glass to within about 50% and preferably within about 20%.

As an example of the extrusion process using Corning 8161 glass, 91 expendable copper rods, each approximately one-quarter inch in diameter, were arranged in a hexagonal configuration between a pair of copper index plates. The index plates were cylindrical in shape with a diameter of 4.18 inches. Copper filler plates approximately 2.09 inches wide with an outer radius of curvature of 2.09 inches were strapped onto the six faces of the hexagonal configuration formed by the rods. This assembly was then placed inside a copper extrusion canister having an outside diameter of 5.53 inches and an inside diameter of 4.19 inches, the latter being only slightly greater than the diameter of the rod, filler plate, and index plate assembly in order to insure a snug fit. The canister was outgassed at 300° F. for several hours, evacuated, and sealed off. The canister and its contents were then heated to 1050° F., and extruded at a speed of 5 inches per minute with an extrusion ratio of 100:1. The resultant extruded bar was .548 inch in outside diameter and had an inner core .418 inch in diameter inside which the hexagonal configuration was inscribed.

The extruded bar was then cut into five-inch lengths whose end faces were coated to protect them from acid attack. The resultant pieces were next immersed in a solution of 0.2 N $HNO_3$ to remove the canning material and the filler plates and to expose the hexagonal pattern in the interior of the bar. Approximately 90 of the resulting segments were then packed together in a generally closely packed array which is facilitated by the hexagonal configuration of each segment and were inserted into the interior of a copper extrusion canister having an outside diameter of approximately 6.5 inches and an inside diameter of approximately 5.5 inches. The array was centered in this canister and surrounded by powdered glass which was poured into the canister while the canister was vibrated. Particles of the order of 200 mesh on the Tyler scale (approximately 74 microns) were used so that the bulk density was approximately 50–60% of the theoretical maximum density. An end plate was then welded onto the canister to seal it.

The canister and its contents were next heated to a temperature of 1050° F. and extruded at a speed of 5 inches per minute with a reduction ratio of approximately 25 to form the final extruded bar from which the channel plates were recovered. This bar was cut into segments of appropriate length corresponding to the desired thickness of each of the channel plates to be formed. The canning material surrounding the channel plates and the expendable rod material which defined the apertures extending through the plates were then removed by acid treatment as described previously. After washing and other final preparations, the resultant plates were annealed for several hours at a temperature of several hundred degrees Fahrenheit to again remove any stresses resulting from the extrusion and the acid treatment. The plates are then finally formed by suitably masking them and then firing them in a reducing atmosphere (such as hydrogen gas) to reduce the exposed lead oxide to thereby form a conductive coating on the interior channel walls.

Although the above procedure yielded channel plates with a large number of apertures extending through them and distributed in a relatively ordered array, it has been found that complete uniformity of each and every one of the channels within a plate was not obtained. This is attributed to the fact that the powder from which the plate is formed is only partially compacted prior to extrusion, the packing density increasing suddenly to nearly 100% during the "upset" period just prior to extrusion of the canister and its contents through the die. During this upset period, and just prior to full densification of the powder, the rods bow outward slightly in the vicinity of the outer portions of the hexagonal rod array and are held in this position during extrusion by the surrounding fully dense mass which has been formed from the powder. As a result, some of the rods on the outer edges of the hexagonal array assume an elliptical cross section on extrusion and thereby distort the otherwise ordered array.

If this distortion is too great to be tolerated, it may be alleviated in any of several ways, for example, by using shorter, thicker rods in an array containing a smaller total number of rods or by utilizing an extrusion canister which allows full compaction of the powdered material before extrusion forces are applied axially to the filler rods. Both of these approaches are utilized in the alternate embodiment shown in FIGS. 8 and 9 which are longitudinal and cross-sectional views respectively of an extrusion canister 80 having a side wall 82 which is circular on the outside and hexagonal on the inside and having a hexagonal nose cone 84 with a central bore 84 symmetrically disposed in it to receive a single disposable rod 88. Powdered material 90 from which the channel plate is to be formed surrounds the rod 88. A hexagonal end plug 92 having a cylindrical bore 94 centrally disposed in its inner face for receiving the rod 88 is tack welded to the wall 82 to close the canister 80. An exhaust line 96 communicates through the bore 94 to the interior of the canister to provide a means for evacuating the extrusion container prior to sealing it off.

In operation, the nose cone 84 is tack welded to the canister wall 82 and the rod 88 inserted into the aperture 86. The container is then tipped into vertical position resting on the nose cone 84 and is lightly vibrated while being filled with powder 90. Again, the powder may be further compacted by applying a force to it in the container. The end plug 92 is then fitted into the container and over the rod 66.

The container is then evacuated, sealed off, heated to the desired extrusion temperature, and extruded through a reducing die to form a solid cylindrical rod of reduced diameter having a hexagonal interior core surrounding a cylindrical filler rod.

This rod is then processed in the usual fashion, that is, the rod is cut into short lengths, then end faces of these short lengths are coated to protect the filler rod from acid attack, the rods are immersed in a corrosive bath to remove the outer container material and then rinsed in water; the hexagonal core and central cylindrical rod are then repacked into a closely-packed array for re-extrusion. Since the initial extrusion formed only a single channel, the number of channels formed by the second extrusion will still be inadequate and generally it will be necessary to segment the rod produced in the second extrusion, repack the segmented pieces in a closely-packed array, and extrude a third time in order to achieve a channel density of the magnitude obtained with the process previously described. Although this adds to the cost of producing the channel plate, it does have the advantage that the apertures formed in the plate are more nearly circular in cross section, and, more importantly, are more equally spaced.

As so far described, we prefer to perform at least the first extrusion with a canister having a hexagonal interior. This reduces the movement of the filler rods during the second extrusion since the hexagonal glass cores formed during the first extrusion may then be packed together in an array having no void spaces between the cores. This leads to a generally more uniform array of channels in most cases in contrast to the irregularity of channel spacing and channel wall thickness which often occurs due to the movement of the rods and glass during the second extrusion when the initial extrusion produces rounded glass cores only. However, where this is not objectionable, either due to the materials used or due to the application for which the plate is intended, an extrusion canister of rounded interior may be utilized for the first extrusion.

From the above, it will be seen that we have provided an improved method of making a channel plate. Our method produces a large number of dimensionally-controlled plates with uniform apertures distributed over an ordered array. It provides greater flexibility in the choice of starting materials and allows fabrication of channel plates from materials not usable with current techniques.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of producing a channel plate structure comprising the steps of:
   (A) positioning at least one removable rod within a first container surrounding said rod;
   (B) completely surrounding said rod with powdered glass;
   (C) sealing said container and pressure-forming it to obtain a first channel-forming bar;
   (D) removing the canister material from said bar;
   (E) closely packing a plurality of segments of at least one channel-forming bar into a second container;
   (F) pressure-forming said segments to form a second channel-forming bar; and
   (G) removing the canister material and the rods extending through said bar to form a channel plate having a plurality of channels extending therethrough in an ordered array.

2. The method of claim 1 in which said first container has hexagonal interior walls surrounding said at least one rod whereby a hexagonal bar is formed by the first forming operation.

3. The method of claim 2 in which the closely-packed segments of said first channel-forming bar are packed within a glass powder surrounding said segments within said second container prior to the second forming operation whereby a solid glass casing is formed around the bundled segments by the second forming operation.

4. The method of claim 1 in which a plurality of rods are positioned within said first container, said rods positioned therein by means of first and second index plates axially aligned with, and spaced from, each other, each said plate having a plurality of apertures formed therein in an ordered array for receiving said rods and maintaining them in parallel alignment within said container during the first forming operation.

5. The method of claim 4 in which said apertures are regularly spaced in a hexagonal pattern on said index plates and which includes a plurality of spacer plates positioned adjacent the outermost rods in said hexagonal pattern and extending axially therealong, each said spacer plate having a planed interior surface adjacent said rods but spaced slightly therefrom and coincident in width with one side of said hexagonal pattern and having a surface opposite said plane surface which is curved to conform to the interior wall of said first container.

6. The method of claim 1 in which said removable rod and said powdered glass are extruded at a temperture within 100°F. of, the softening temperature of said glass, whereby said powdered glass is formed into a fully dense, coherent solid by said extrusion.

7. The method of claim 1 in which said removable rod is of copper and in which said rod is removed from the formed channel structure by treating said structure with acid.

8. The method of claim 1 in which said forming operation is an extrusion and in which said first container has a movable nose cone fitted within said container for axial movement therein and lightly bonded thereto prior to said extrusion to restrain said movement, said bond being released by said extrusion to permit an axial inward movement of said nose cone during extrusion whereby said powder may be compressed by said movement.

9. A method of producing a channel plate structure comprising the steps of:
   (A) centering an expendable rod within a first extrusion container having walls defining a hollow interior;
   (B) filling the space between the rod and the container walls with an electrically activable powder;
   (C) inserting within said container and coaxial therewith an axially movable nose cone contoured to the interior walls of said container and forming a frontal closure therefor, said nose cone having an aperture for receiving said rod when said cone is moved into said container beyond a predetermined limit;
   (D) sealing said container;
   (E) extruding said first container through an extrusion die providing an extrusion ratio greater than 10:1 to thereby form a first extruded bar of substantially reduced cross section, said extrusion simultaneously causing axial movement of said nose cone into said container to further compact said powder immediately prior to passage through the extrusion die;
   (F) removing the container material from the extruded bar and packing a plurality of segments obtained from at least one said bar into a second extrusion container in closely packed fashion having their longitudinal axes aligned with each other;
   (G) extruding said second container through an extrusion die providing an extrusion ratio greater than 10:1 to thereby form a second extruded bar of reduced cross section; and
   (H) segmenting said second bar along planes extending orthogonal to said rods and removing the container material and said expendable rods from said second bar to thereby form channel plates from each such segment, each said plate having a plurality of hollow channels extending axially therethrough.

10. The method of claim 9 in which said activable material is a glassy substance.

11. The method of claim 10 in which said material is activable on exposure to a reducing atmosphere to form conducting areas on the walls of said channels.

12. The method of claim 9 in which said material is a semiconductor.

13. The method of claim 12 in which said material is chosen from the group of glasses containing reducible oxides.

14. The method of claim 9 in which the walls of said first container surrounding said rod are hexagonal in cross section to thereby impart a hexagonal cross section to said first bar.

15. The method of claim 9 in which the closely packed plurality of segments assembled in said second extrusion container are laterally separated from the walls of said container by an extrudable powder for forming a casing around segments when said second container is extruded.

References Cited

UNITED STATES PATENTS

| | | | |
|---|---|---|---|
| 2,499,977 | 3/1950 | Scott | 29—423UX |
| 2,608,722 | 9/1952 | Stuetzer | 29—592 |
| 3,394,213 | 7/1968 | Roberts et al. | 29—419X |
| 3,413,707 | 12/1968 | Klein et al. | 29—423X |

ANDREW R. JUHASZ, Primary Examiner

U.S. Cl. X.R.

29—423